(12) United States Patent
Cromheecke et al.

(10) Patent No.: US 10,239,418 B2
(45) Date of Patent: Mar. 26, 2019

(54) MULTI-TRAJECTORY TRACK AND MOVER SYSTEM

(71) Applicant: ROCKWELL AUTOMATION TECHNOLOGIES, INC., Mayfield Heights, OH (US)

(72) Inventors: Michael Wayne Cromheecke, Milwaukee, WI (US); Oliver Charles Wexner Haya, Milwaukee, WI (US); Paul Jerome Grosskreuz, West Bend, WI (US); Jeffrey William Dujmovic, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 232 days.

(21) Appl. No.: 15/188,203

(22) Filed: Jun. 21, 2016

(65) Prior Publication Data

US 2017/0361731 A1 Dec. 21, 2017

(51) Int. Cl.
*B60L 13/03* (2006.01)
*B61B 13/12* (2006.01)

(52) U.S. Cl.
CPC .............. *B60L 13/03* (2013.01); *B61B 13/12* (2013.01); *B60L 2200/26* (2013.01)

(58) Field of Classification Search
CPC .......... B60L 13/00; B60L 13/03; B60L 13/04; B60L 13/06; B60L 13/08; B60L 13/10
See application file for complete search history.

(56) References Cited

U.S. PATENT DOCUMENTS 6,876,107 B2 * 4/2005 Jacobs .................... B60L 15/38
310/12.19
2013/0192487 A1 8/2013 Fanshawe et al.

* cited by examiner

*Primary Examiner* — Robert J McCarry, Jr.
(74) *Attorney, Agent, or Firm* — Fletcher Yoder, P.C.

(57) ABSTRACT

A linear drive transport system may include a track that includes first, second, third, and fourth track surfaces that define perimeter boundaries of the track and a magnetic drive system. The first, second, third, and fourth track surfaces include first, second, third, and fourth trajectories about the track, respectively, which are each different from one another. A mover may move along the track and include first and second leading bearings that interact with the first and second track surfaces, respectively, and first and second lagging bearings that interact with the third and fourth track surfaces, respectively, and a reaction element that interacts with the magnetic drive system to generate a propulsive force. The first and second leading bearings may be coupled to the mover at a first fixed distance from one another, and the first and second lagging bearings may be coupled to the mover at a similar distance.

20 Claims, 8 Drawing Sheets

MULTI-TRAJECTORY TRACK AND MOVER SYSTEM

BACKGROUND

The present disclosure is generally directed to linear drive transport systems. More particularly, present embodiments are directed to track-trajectories and bearing configurations of movers in linear drive transport systems.

BRIEF DESCRIPTION

Present embodiments include a linear drive transport system. The linear drive transport system may include a track including a plurality of contact surfaces. The contact surfaces define perimeter boundaries of the track. The linear drive transport system may also include a mover that includes a plurality of bearings that engage the plurality of contact surfaces and moves along the track via a magnetic drive system. Further, the linear drive transport system may include first, second, third, and fourth contact surfaces of the plurality of contact surfaces, and the first and second contact surfaces may be positioned opposite one another and the third and fourth contact surfaces may be positioned opposite one another such that the first and second contact surfaces and the third and fourth contact surfaces are uniformly spaced apart along straightaway portions of the track. Furthermore, the linear drive transport system may include a first leading bearing of the mover engaging the first contact surface and a second leading bearing disposed opposite the first leading bearing and engaging the second contact surface. The first and second leading bearings may be coupled to a body of the mover a first fixed distance from one another. Moreover, the linear drive transport system may include a first trailing bearing of the mover engaging the third contact surface and a second trailing bearing disposed opposite the first trailing bearing and engaging the fourth contact surface. The first and second trailing bearings may be coupled to the body of the mover a second fixed distance from one another, the first trailing bearing may be coupled to the body of the mover a third fixed distance from the first leading bearing, and the second trailing bearing may be coupled to the body of the mover a fourth fixed distance from the second leading bearing. Additionally, the linear drive transport system may include curved portions of the track. The first contact surface may define a portion of the perimeter boundary with a first trajectory different than a second trajectory of the second contact surface in the corresponding curved portions of the track, and the first and second trajectories may maintain contact with the first and second leading bearings throughout the curved portions the track.

Present embodiments also include another linear drive transport system. The linear drive transport system may include a track. The track may include a first track surface, a second track surface, a third track surface, and a fourth track surface that define perimeter boundaries of the track. The first track surface includes a first trajectory about the track, the second track surface includes a second trajectory about the track, the third track surface includes a third trajectory about the track, and the fourth track surface includes a fourth trajectory about the track. Further, the first trajectory, the second trajectory, the third trajectory, and the fourth trajectory are each different from one another. The track may also include a magnetic drive system. Additionally, the linear drive transport system may include at least one mover that moves along the track. The at least one mover may includes a first leading bearing that interacts with the first track surface, a second leading bearing that interacts with the second track surface, a first lagging bearing that interacts with the third track surface, and a second lagging bearing that interacts with the fourth track surface. Furthermore, the first leading bearing and the second leading bearing may be coupled to the at least one mover at a first fixed distance from one another, and the first lagging bearing and the second lagging bearing may be coupled to the at least one mover at a second fixed distance that is equal to the first fixed distance. Moreover, the at least one mover may include a reaction element that interacts with the magnetic drive system of the track to generate a propulsive force on the mover.

Present embodiments also include a mover of a linear drive transport system. The mover may include a plurality of bearings arranged in a trapezoidal shape and that maintain constant contact with a plurality of track surfaces of the linear drive transport system when the mover enters and exits a curve of a track of the linear drive transport system. Additionally, the mover may also include a reaction element that interacts with a magnetic drive system of the linear drive transport system to generate a propulsive force on the mover.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

A linear drive or linear motor generally includes an electromagnetic device that operates to provide motion along a path, or a "linear motion" rather than the rotary motion typically provided by a standard electric motor. In operation, a linear drive typically produces electromotive force in a conductor by changing a magnetic field about the conductor. Specifically, linear drives generally function based on interactions between electromagnets and permanent magnets. Coils of the electromagnets can be charged to create magnetic fields that interact with permanent magnets to provide motion. There are two fundamental linear drives categories, which may be referred to as moving magnet (or fixed coil) linear drives and moving coil (or fixed magnet) linear drives. In a moving magnet linear drive, the coils are fixed within a track or track segments and movers along the track include permanent magnets. In a moving coil linear drive, permanent magnets are fixed within a track or track segments and movers along the track include coils. Certain functional characteristics of these two categories are different and often play a key role in determining which category to employ for a particular purpose. For example, moving magnet linear drives allow for unpowered movers whereas moving coil linear drives generally require that power be provided to the electromagnet on each mover. As another example, moving coil linear drives are often capable of greater movement precision for the movers than moving magnet linear drives.

Linear drives are often used in transport systems that facilitate different types of industrial operations. For example, linear drive transport systems may be utilized to convey products to different areas in a manufacturing or packaging operation. It is now recognized that, due to the nature of the interaction between movers and track segments in linear drive systems, many linear drives may provide inefficient contact between the movers and the track segments as the track segments enter and exit curved portions of the linear drive systems. This may result in limited mover velocity and power inefficiencies in the linear drive systems. It is now recognized that it may be desirable to have multiple trajectories of the track segments around curves in conveyance paths that interact with the multiple bearing of the movers in certain industrial operations. Alternatively, it may be desirable to alter a configuration of the bearings of the mover to more closely correspond to the curvatures of the tracks.

Traditionally, the tracks utilized in linear drive transport systems maintain constant trajectories around paths of the tracks. To improve functional velocity and operational efficiency of the tracks utilized in the linear drive transport systems, it may be beneficial to vary the trajectories of the tracks, as described in detail below. By varying the trajectories of the tracks, bearings of a mover travelling around the track may maintain constant contact with the track as the mover navigates curves on the paths of the tracks. For example, in traditional configurations, the mover may lose contact between one or more bearings as the mover enters or exits a curve in the track. When the mover briefly loses contact with the tracks at high speed, efficiency is lost and increased wear on both the mover and the tracks may be experienced due to erratic motion. Accordingly, as discussed herein, altering the track trajectory and/or the bearing configuration of the mover may enable the bearings of the mover to maintain contact with the track to limit wear, increase operational velocity, and increase operational efficiency.

Figure 1A:
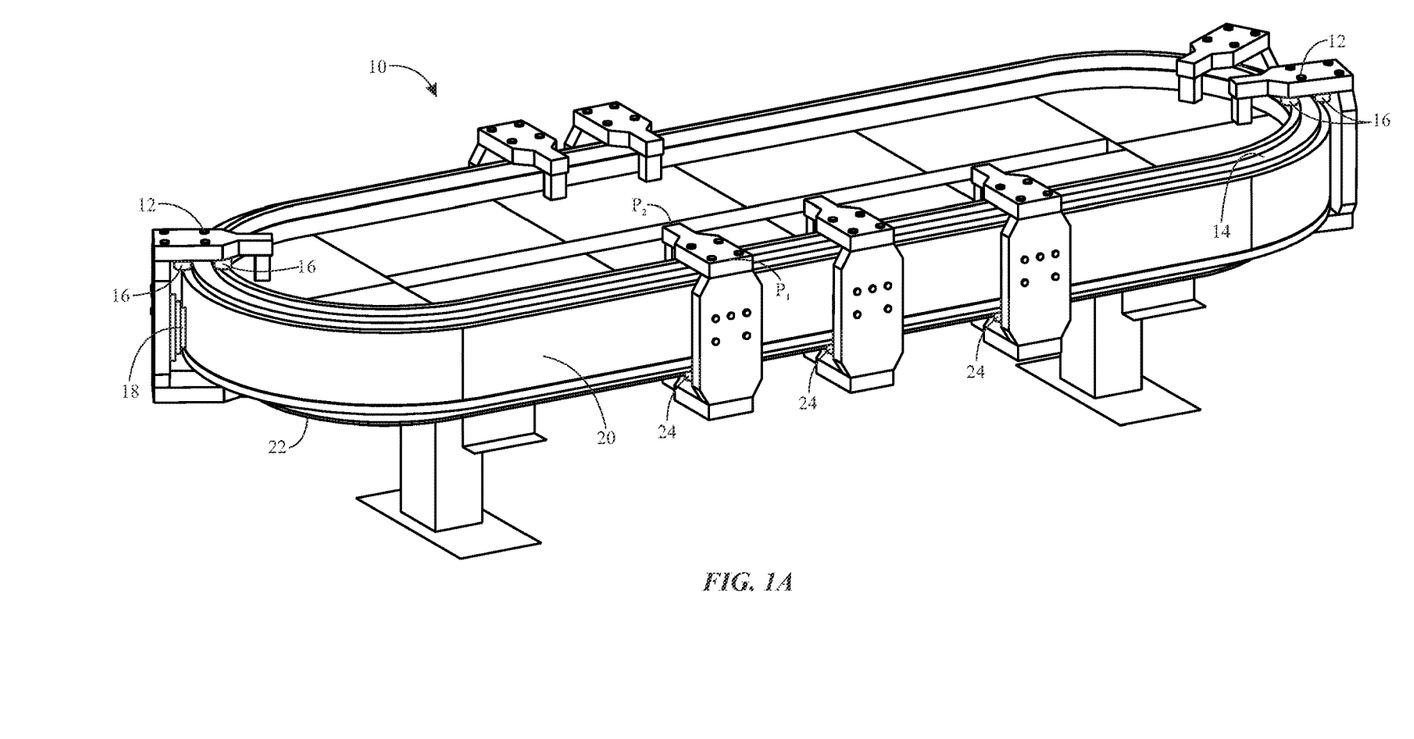
FIG. 1A is a perspective view of a linear drive transport system, in accordance with present embodiments.

FIG. 1A is a perspective view of a linear drive transport system 10 in accordance with present embodiments. The linear drive transport system 10 includes a mover 12 that facilitates transfer of goods along a track 14 of the linear drive transport system 10. Thus, the mover 12 and any associated article (e.g., products disposed on or otherwise engaged by the mover 12) being transported by the linear drive transport system 10 may travel along the track 14 with precision from one point to another.

The mover 12 may include bearings 16, which interact with the track 14 while the mover 12 is in motion. Additionally, the mover 12 includes reaction elements 18, which may include one or more magnets that interact with a magnetic drive system 20 of the linear drive transport system 10 to transport the mover 12 around the track 14. Further, in some embodiments, the reaction elements 18 may be electromagnet coils, and the magnetic drive system 20 may include a system of magnets that interact with the electromagnet coils.

Also illustrated is a lower track portion 22 with which lower bearings 24 of the mover 12 interact. The lower track portion 22 and the lower bearings 24 function to generally maintain the reaction elements 18 in a constant position relative to the magnetic drive system 20. It may be appreciated that the lower track portion 22 and the lower bearings 24 may not be utilized in every embodiment of the linear drive transport system 10. For example, if the mover 12 is designed in such a manner that the reaction elements 18 maintain a substantially constant position relative to the magnetic drive system 20 absent the lower track 22 and the lower bearings 24, then the lower track 22 and the lower bearings 24 may not be used in the linear drive transport system 10.

Figure 1B:
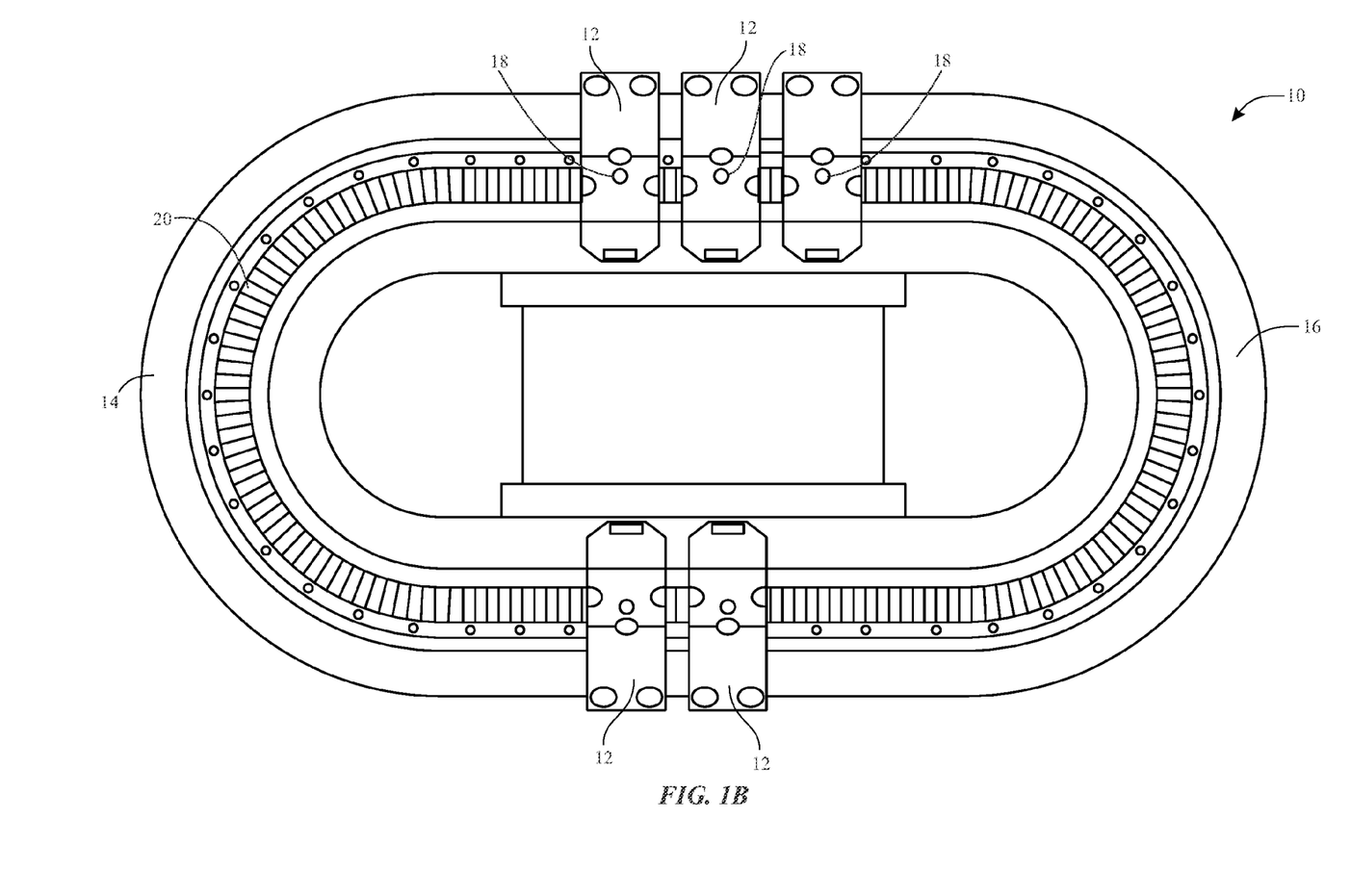
FIG. 1B is a top view of a similar linear drive transport system in which a magnetic drive system is positioned differently than in the system of FIG. 1A, in accordance with present embodiments.

FIG. 1B a top view of a similar linear drive transport system 10 in which a magnetic drive system 20 is positioned differently than in the system of FIG. 1A. In this configuration, rather than the magnetic drive system 20 being positioned around a periphery of the track 14, the magnetic drive system 20 is positioned around a top of the system, in a generally planar arrangement. The reaction elements 18 of each mover 12 face the magnetic drive system 20 and are spaced from the magnetic drive system 20 by a small air gap.

Figure 2:
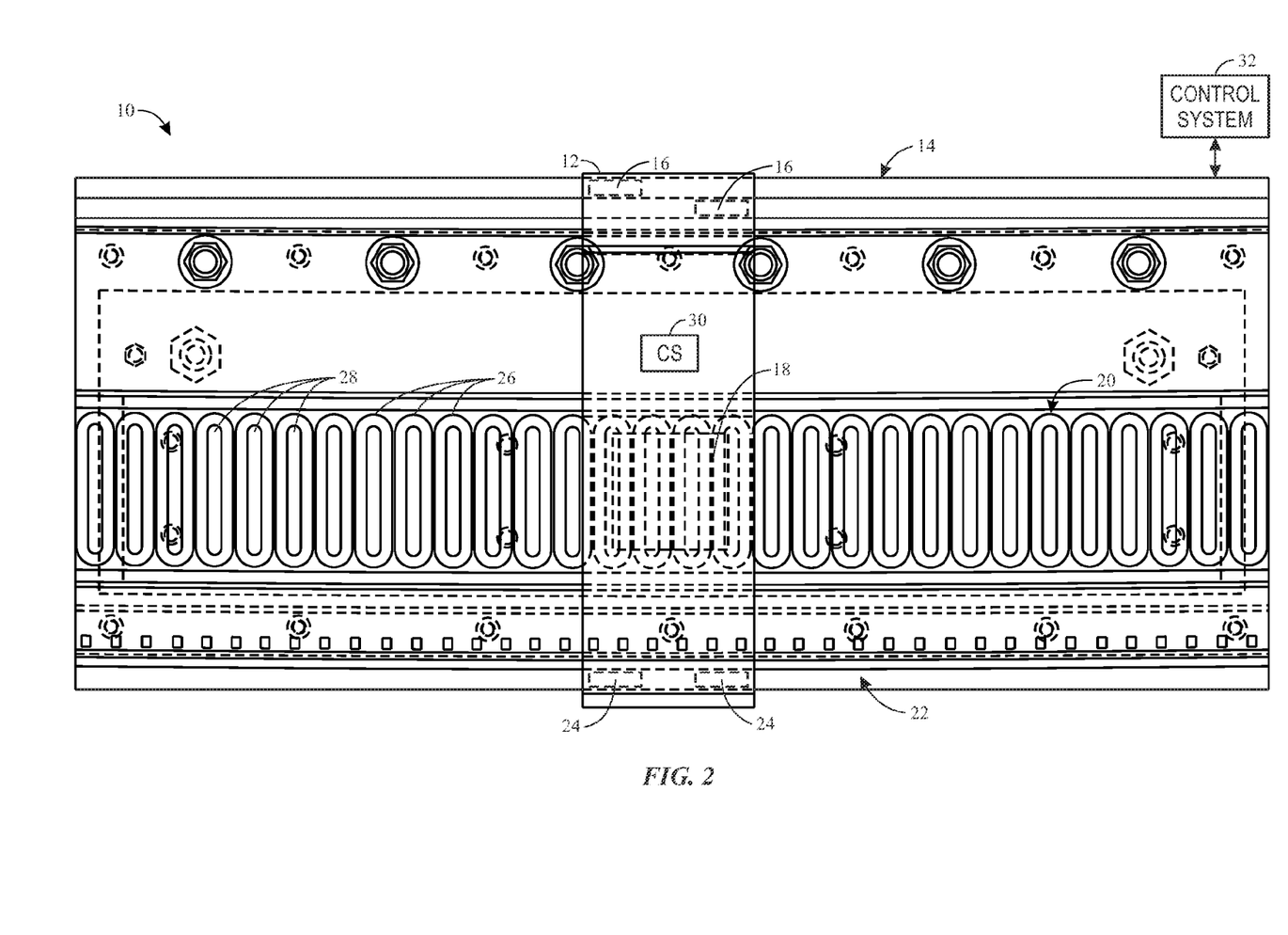
FIG. 2 is a side view of a portion of a track of the linear drive transport system including a mover coupled to the track, in accordance with present embodiments.

FIG. 2 is a side view of a portion of the track 14 of the linear drive transport system 10 including the mover 12 coupled to the track 14, in accordance with present embodiments. In FIG. 2, certain elements are illustrated as transparent to better illustrate internal features. The linear drive transport system 10 includes the track 14 and the magnetic drive system 20 with a plurality of electromagnet coils 26 coupled to stators 28 mounted along the magnetic drive system 20. The electromagnet coils 26 receive an electric current having a set frequency to generate an electromagnetic field.

Additionally, coupled to the track 14 is the mover 12 mounted to permit travel along the track 14. When multiple movers 12 are coupled to the track 14, each of the movers 12 are controlled to move independently of each other, and the movers 12 each include reaction elements 18. The reaction elements 18 may include one or more magnets, such as rare-earth permanent magnets. When the electromagnet coils 26 are energized, an electromagnet field is generated, and the electromagnetic field interacts with the reaction elements 18 of the movers 12 to create a propulsive force that operates to propel the movers 12 along the track 14.

Each mover 12 further includes a control sensor 30 that provides a signal for use by a control system 32 to operate the magnetic drive system 20 that energizes and/or de-energizes the appropriate electromagnet coils 26 positioned along the track 14. By energizing or de-energizing the electromagnet coils 26, the magnetic drive system 20 is able to produce controlled movement of each individual mover 12. Data provided by the control sensor 30 may include a position of the mover 12 along the track, an identification of goods carried by the mover 12, and/or the weight of the goods carried by the mover 12 for use in controlling the electromagnet coils 26 to provide an appropriate propulsive force on the movers 12.

Figure 3:
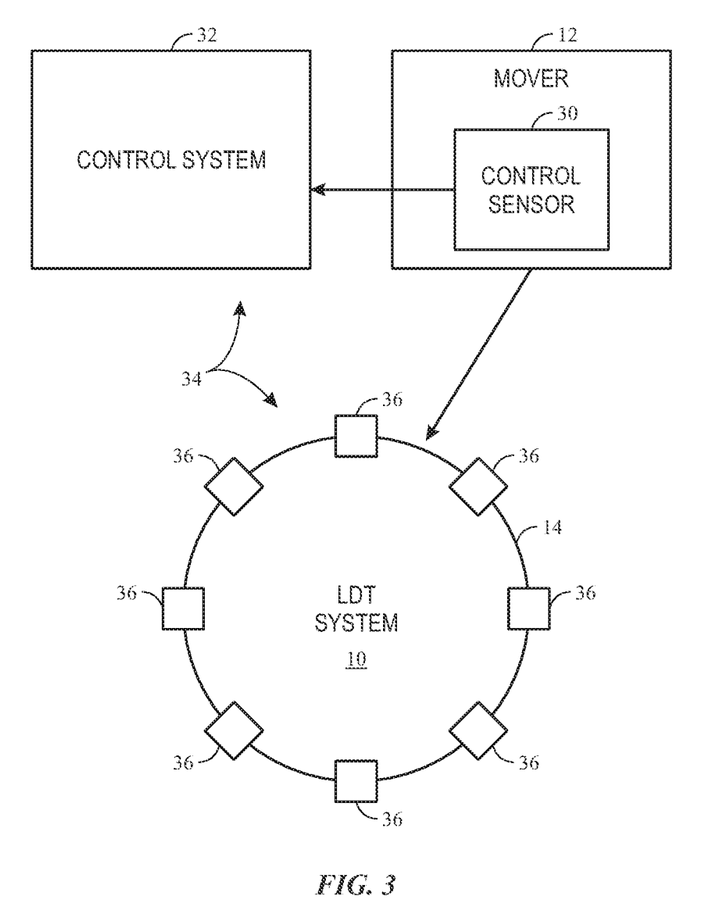
FIG. 3 is a schematic diagram of the linear drive transport system showing the relationship between the control system and the track, a sensor array having a plurality of sensors positioned along the track, and a mover, in accordance with present embodiments.

FIG. 3 is a schematic diagram of the linear drive transport system 10 showing the relationship between the control system 32 and the track 14, a sensor array 34 having a plurality of sensors 36 positioned along the track 14, and a mover 12, in accordance with present embodiments. As depicted, the linear drive transport system 10 may include a sensor array 34 that employs a plurality of sensors 36, such as linear encoders, spaced at fixed positions along the track 14. The sensor array 34 provides data to the control system 32 by sensing the control sensors 30 mounted on each mover 12 as the mover 12 passes near the sensors 36. Once the mover 12 passes near the sensor 36, the sensor array 34 provides a signal indicative of a location of the mover 12 to the control system 32. In some embodiments, each control sensor 30 is an "incremental absolute" position encoder, which is communicatively coupled to the control system 32. The control sensor 30 and the control system 32 may operate together to sense and count incremental pulses (or digitize sine/cosine signals to create these pulses) after a mover 12 has traveled past a reference point on the track 14.

Figure 4:
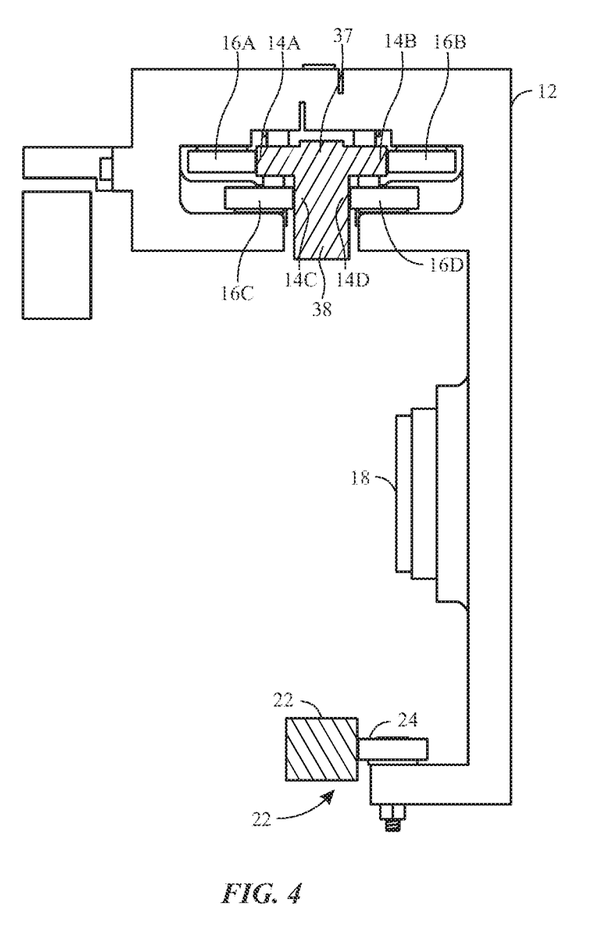
FIG. 4 is a side view of the mover and a cross-section of the track of the linear drive transport system, in accordance with present embodiments.

FIG. 4 is a side view of the mover 12 and a cross-section of the track 14 of the linear drive transport system 10, in accordance with present embodiments. The track 14 includes four track surfaces 14a, 14b, 14c, and 14d (i.e., contact surfaces of the track 14), and that respectively interact with four bearings 16a, 16b, 16c, and 16d of the mover 12. It may be appreciated that while the four track surfaces 14a, 14b, 14c, and 14d are depicted, the track 14 may include more or fewer track surfaces. For example, the track 14 may include two track surfaces, three track surfaces, five track surfaces, six track surfaces, or more. Further, the mover 12 may include the same number of bearings 16 as the number of track surfaces. Moreover, the track surfaces 14a-14d may define perimeter boundaries of the track 14.

Additionally, in some embodiments, the track 14 may include more contact surfaces than a number of bearings 16 on the mover 12. For example, the track 14 may include six contact surfaces that are capable of interacting with a mover 12 that includes six bearings 16, but a mover 12 with five or fewer bearings 16 may also operate on the track 14 with six contact surfaces. Moreover, the mover 12 may include more bearings 16 than a number of contact surfaces on the track 14. In such a situation, the bearings 16 of the mover 12 may include one or more bearings 16 that do not interact with the track 14 during operation, or multiple bearings 16 may interact with the track 14 on a single contact surface of the track 14.

As illustrated, the mover 12 includes the bearings 16a-16d that interact with the track surfaces 14a-14d (i.e., contact surfaces). The track 14 may include a T-shaped cross-section to include the four track surfaces 14a, 14b, 14c, and 14d. Due to the shape of the track 14, the bearings 16a and 16b may be positioned above and outside the bearings 16c and 16d. That is, the bearings 16a and 16b align with an upper portion 37 of the T-shape of the track 14 and the bearings 16c and 16d align with a lower portion 38 of the T-shape of the track 14. Additionally, the bearings 16a and 16b may be respectively spaced an equal distance in a direction of travel of the mover 12 from the bearings 16c and 16d. Thus, depending on a direction of travel, there will be pairs of leading and lagging bearings 16. In this manner, each leading bearing (e.g., 16a and 16b) is an equal distance from its respective lagging bearing (e.g., 16c and 16d) in comparison with the set of leading and lagging bearings on the opposite side of the track 14.

Also illustrated is a lower bearing 24 positioned on a side of the reaction element 18 opposite from the bearings 16a-16d. While only a single lower bearing 24 is shown in FIG. 4, it may be appreciated that each mover 12 may have additional lower bearings 24 to increase stability of the movers 12. Also shown is the lower track portion 22, which interacts with the lower bearing 24 during operation of the linear drive transport system 10. As illustrated, the lower track portion 22 is positioned directly beneath a center of the track 14. However, it may be appreciated that the lower track portion 22 may be positioned beneath and offset from the track 14. Additionally, should the lower track portion 22 be offset from the track 14, the lower bearing 24 may be positioned on the mover 12 in such a manner as to track the offset of the lower track portion 22 from the track 14.

Further, the reaction element 18, as illustrated in FIG. 4, includes multiple permanent magnets, such as rare earth permanent magnets. As discussed above, the permanent magnets of the reaction element 18 interact with a magnetic field generated by the electromagnet coils 26 of the magnetic drive system 20 to provide a propulsive force on the mover 12. In other embodiments, the reaction element 18 may include electromagnet coils 26 that are powered by an on-board power source of the mover 12 or via a tether. In such an embodiment, the magnetic drive system 20 of the track 14 may include a series of alternating polarity permanent magnets. In this manner, the reaction element 18 of the mover 12 may generate the magnetic field that interacts with the permanent magnets of the magnetic drive system 20 to provide the propulsive force on the mover 12.

As discussed in greater detail below, the track surfaces 14a, 14b, 14c, and 14d each have unique trajectories throughout the course of the track 14. For example, to maintain all of the bearings 16a-16d in contact with the track surfaces 14a-14d, and to increase related efficiencies, the trajectories of the track surfaces 14a-14d may vary as the track 14 enters and exits curved sections of the track 14. Further, in an embodiment with greater than four track surfaces, each additional track surface may also have a unique trajectory based on a position of a corresponding additional bearing 16 on the mover 12.

Figure 5:
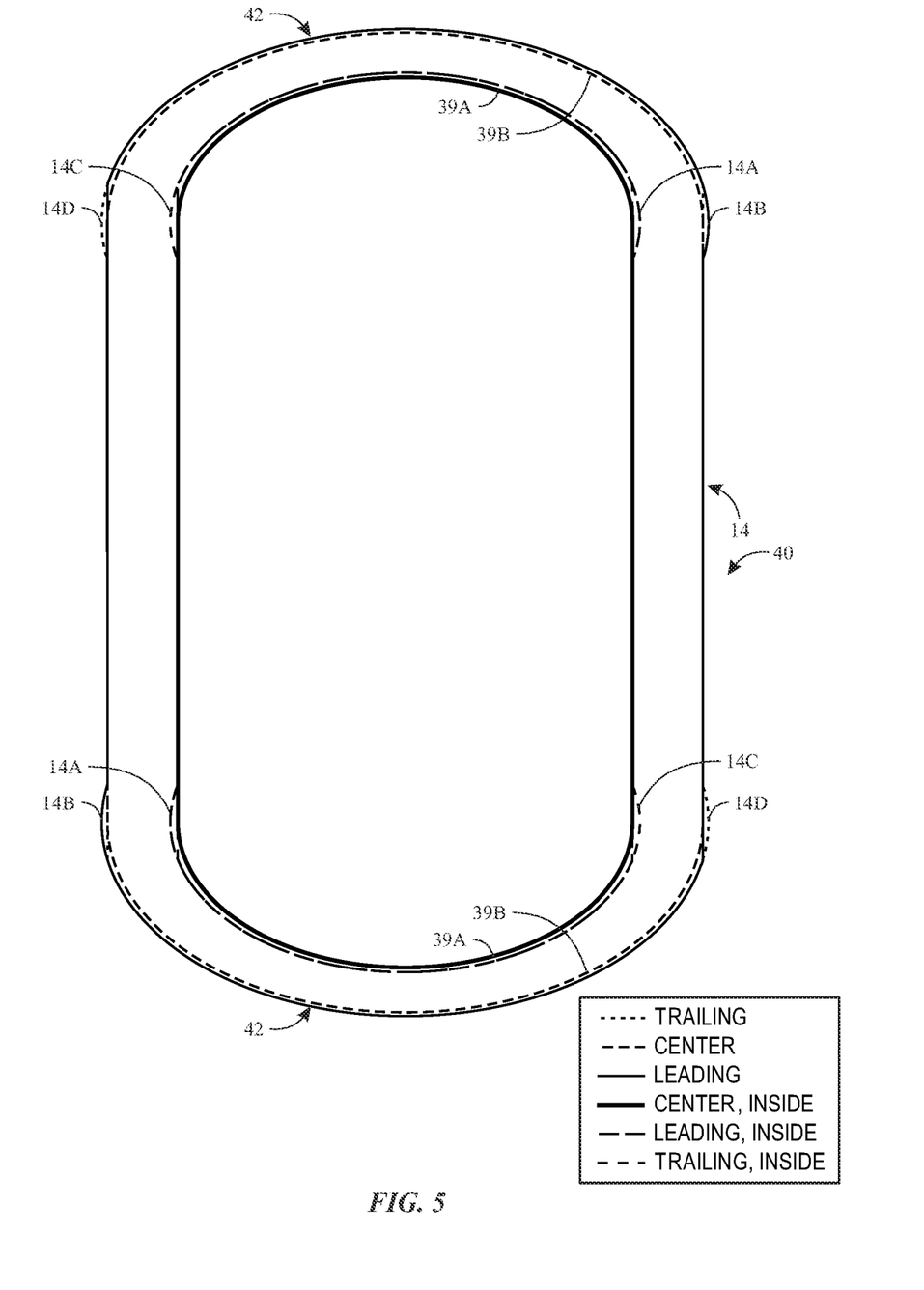
FIG. 5 is an overhead view of trajectories of different surfaces of the track of the linear drive transport system, in accordance with present embodiments.

FIG. 5 is an overhead view of trajectories of the different surfaces 14a-14d of the track 14 of the linear drive transport system 10, in accordance with present embodiments. As illustrated, each of the track surfaces 14a-14d has a unique trajectory about the track 14. It may be appreciated that the track 14 depicted in FIG. 5 is representative of a track 14 for use with the mover 12 that has bearings 16a and 16b spaced apart at an equal distance as bearings 16c and 16d. Accordingly, the track surfaces 14a-14d of a track 14 with a T-shaped configuration, as depicted in FIG. 4, may include slightly different trajectories. For example, the track surfaces 14c and 14d may be closer together than the track surfaces 14a and 14b, and the track surfaces 14c and 14d may not overlap with the track surfaces 14a and 14b, respectively, at any point along the track 14.

Figure 6:
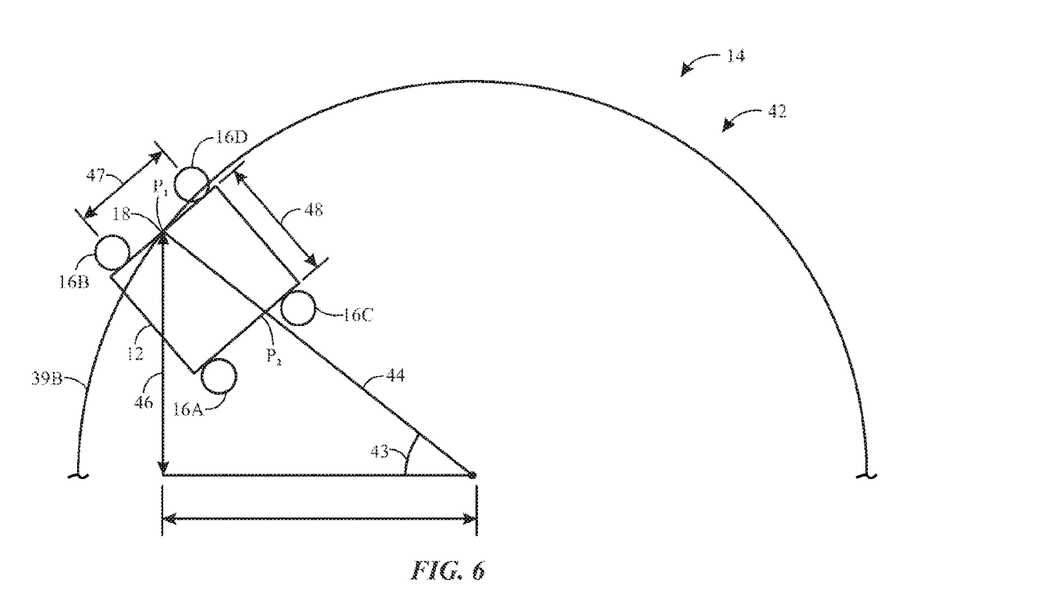
FIG. 6 is a schematic diagram of the mover of FIG. 2 in relation to a curved portion of the track of FIG. 5, in accordance with present embodiments.

Also depicted are paths 39a and 39b of points along both an inner side and an outer side of a central portion of the mover 12, respectively. The paths 39a and 39b may represent paths of points on the mover 12 that are positioned halfway between the leading bearings 16a and 16b and the lagging bearings 16c and 16d on both the inner and outer portion of the mover 12. Points $P_1$ and $P_2$ in FIGS. 1 and 6 are representative of these positions. Because of the unique trajectories of the track surfaces 14a-14d, the paths 39a and 39b are defined by travel about the track 14 in a continuous manner. That is, the paths 39a and 39b maintain a constant course position in relation to the track 14 throughout straight portions 40 and curved portions 42 of the track 14. In this manner, the mover 12 maintains the reaction element 18 at a substantially constant distance and alignment with the magnetic drive system 20 of the track 14, which may allow greater control over the mover 12 during operation of the linear drive transport system 10. Further, the reaction element 18 may include greater than one reaction elements 18 that are each maintained at a fixed distance throughout the curved portions 42 of the track 14. Further, it may also be desirable to change a distance of the reaction elements 18 from the track 14. In such a situation, the track surfaces 14a-14d may be arranged in such a manner to alter a distance of the reaction elements 18 from the track 14 when the mover 12 travels along the track 14.

Greater control over the mover 12 may be especially evident in the curved portions 42 of the track 14, as a single trajectory track of a linear drive transport system 10 may result in several changes in distance and orientation between the reaction element 18 and the magnetic drive system 20 throughout the course of a single curved portion 42 of the track 14. As distances and orientation between the reaction element 18 and the magnetic drive system 20 change, control of the electromagnet coils 26 of the magnetic drive system 20 may also change to maintain a constant velocity and performance of the mover 12. Accordingly, the unique trajectories of the track surfaces 14a-14d may enable reduced complexity in the control system 32 for maintaining the velocity and performance of the mover 12. Further, the unique trajectories of the track surfaces 14a-14d may enable greater accuracy in the positioning of the movers 12 along the track 14.

It may also be appreciated that the unique trajectories of the track surfaces 14a-14d also enable increased efficiency of the movement of the mover 12. For example, in a singular trajectory system, some of the bearings 16 of the mover 12 may be forced off of the track 14 as the mover 12 enters and exits a curved portion 42 of the track 14. Using the track surfaces 14a-14d illustrated in FIG. 5, all of the bearings 16a-16d maintain constant contact with the track 14 as the mover 12 enters and exits the curved portions 42 of the track 14. For example, due to the unique trajectories of the track surface 14a-14d, a more complex motion of the mover 12 is established as the mover 12 moves about the curve portions 42 of the track 14. The complex motion of the mover 12 may include aspects of rotation of the mover 12 rather than a more direct movement of the mover 12. Due to the constant contact between the bearings 16a-16d and the track surfaces 14a-14d, the mover 12 may be able to enter and exit the curved portions 42 of the track 14 at a greater velocity without resulting in excessive wear on the track 14 or the mover 12. For example, while a single trajectory track 14 may have potential for the mover 12 to move at approximately 7 meters per second, excessive wear and jitter on the mover 12 and the track 14 may begin to occur at approximately 5 meters per second. In contrast, when utilizing the track surfaces 14a-14d, the mover 12 may reach or exceed a velocity of 7 meters per second without experiencing the wear or jitter on the mover 12 and the track 14. It may also be appreciated that because the bearings 16a-16d maintain constant contact with the track surfaces 14a-14d, forces provided by the bearings 16a-16d on the track 14a-14d may be more evenly distributed to reduce wear and extend the life of the track 14.

Because it is desirable for the reaction element 18 to follow the path 39b, the track surfaces 14a-14d provide unique trajectories for the bearings 16a-16d of the mover 12 to maintain the path 39b for the reaction element 18. That is, each of the track surfaces 14a-14d include a trajectory about the track 14 that is different from the trajectories of the other track surfaces 14a-14d about the track 14. For example, assuming the mover 12 moves in a counter-clockwise direction about the illustrated track 14, a track surface 14a that interacts with an inside leading bearing 16a and a track surface 14b that interacts with an outside leading bearing 16b may each bow outward toward an outer edge of the track 14 as the track 14 enters the curved portion 42 of track 14. While the track surface 14a and the track surface 14b bow outward, a track surface 14c that interacts with an inside lagging bearing 16c and a track surface 14d that interacts with an outside lagging bearing 16d maintain straight paths as in the straight portion 40 of the track 14. Further, a radius of the bowed portion of the track surface 14a may be smaller than a radius of the bowed portion of the track surface 14b. With this geometry of the track surfaces 14a and 14b that interact with the leading bearings 16a and 16b and the track surfaces 14c and 14d that interact with the lagging bearings 16c and 16d, the reaction element 18 is able to maintain a substantially continuous course on the path 39b as the mover 12 enters the curved portion 42. Without these unique trajectories, the fixed arrangement of the bearings 16 on the mover 12 would not be able to consistently maintain engagement with the track 14 because of differences in the track 14 at the leading and lagging bearings 16, respectively.

Similarly, as the track 14 exits the curved portion 42 into a straight portion 40, the track surfaces 14a-14b may again include trajectories about the track 14 that are different from each other. For example, at a point where the track surfaces 14a and 14b, which interact with the leading bearings 16a and 16b, respectively, exit the curved portion 42 of the track, the track surfaces 14c and 14d, which interact with the bearings 16c and 16d, respectively, may begin to bow outward toward an outer edge of the track 14 to maintain the reaction element 18 of the mover 12 along the path 39b. The track surfaces 14c and 14d may bow outward with radii similar to the radii of the track surfaces 14a and 14b when the track 14 entered the curved portion 42. For example, the bow of the track surface 14c may have a radius that is smaller than a radius of the bow of the track surface 14d to maintain the reaction element 18 along the path 39c. Further, in some embodiments, the curved portions 42 may include curvature continuous splines. That is, the radius of the curved portions 42 may continuously change as the track 14 is positioned about the curved portions 42. In such embodiments, the track surfaces 14a-14d may also continually change trajectories to maintain the bearings 16a-16b in constant contact with the track surfaces 14a-14d.

Additionally, the bowing and straightening process of the track surfaces 14a-14d entering and exiting the curved portions 42 may repeat as the mover 12 enters and exits other curved portions 42. Further, it may be appreciated that the trajectories of the track surfaces 14a-14d may generally be functions of a thickness of the track 14, a length between leading and lagging bearings 16 of the mover 12, and a radius of the curved portion 42. Accordingly, the trajectories of the track surfaces 14a-14d may change as one or more of these elements change to maintain the reaction element 18 of the mover 12 on the ideal path 39b.

FIG. 6 is a schematic diagram of the mover 12 in relation to the curved portion 42 of the track 14. The path 39b of the track 14 is depicted as the path 39b that a point (e.g., center of mass) of the reaction element 18 follows as the reaction element 18 of the mover 12 traverses the curved portion 42 of the track 14. The individual trajectories of the track surfaces 14a-14d, which correspond to a location of the bearings 16a-16d, respectively, may be determined based on the positioning of the bearings 16a-16d in relation to the reaction element 18. For example, the track surfaces 14a-14d may be positioned along the track 14 to be in a location that aligns with the bearings 16a-16d while the mover 12 traverses the track 14. During movement around the path 39b of the track 14, an edge of the mover 12 that includes the reaction element 18 is maintained in a parallel orientation to a tangent of the path 39b. Alternatively, the track surfaces 14a-14b may be arranged in such a manner that the reaction element 18 does not have a parallel orientation to the tangent of the path 39b at certain portions of the track where a parallel orientation may not be desirable. For example, when two or more positions of the reaction element 18 are used on the mover 12 as a point of reference to orient the track surfaces 14a-14d, it may be desirable for one of the positions of the reaction element 18 to be closer to the path 39b than the other positions of the reaction element 18.

Accordingly, for example, to determine a precise location of the track surfaces 14a-14d along the curved portions 42 of the track 14, the locations of the bearings 16a-16d are determined in steps as the mover 12 travels along the curved portion 42 of the track 14. In some embodiments, the positions of the reaction element 18 and the bearings 16a-16d may be calculated at every 0.01π radians of the path 39b. In other embodiments, the positions of the reaction element 18 and the bearings 16a-16d may be calculated at every degree of the path 39b. It may also be appreciated that greater accuracy may be desired when calculating the positions of the bearings 16a-16d to enhance accuracy of the trajectories of the track surfaces 14a-14d. In such a situation, the positions of the reaction element 18 and the bearings 16a-16d may be determined at every 0.005π radians of the path 39b or every 0.5 degree of the path 39b. Furthermore, in some instances, to save on production time, less accuracy may also be used in calculating the positions of the reaction element 18 and the bearings 16a-16d. For example, the positions of the reaction element 18 and the bearings 16a-16d may be calculated at every 0.05π or more radians of the path 39b of the track 14.

The positions of the bearings 16a-16d at each point along the path 39b may be calculated based on a relationship of the bearings 16a-16d to the position of the reaction element 18 of the mover 12. Initially, the position of the reaction element 18 may be calculated along the path 39b at each step along the path 39b that is measured. The position may be calculated by multiplying a radius 44 of the path 39b by a cosine of an angle 43 to calculate a length 45 of the reaction element 18 in a horizontal direction from the center of an arc created by the path 39b. To calculate a length 46 of the reaction element 18 in a vertical direction from the center of the arc created by the path 39b, the radius 44 is multiplied by a sine of the angle 43. The result of these two calculations is the x and y coordinates of the reaction element 18 in relation to the center of the arc created by the path 39b.

Once the location of the reaction element 18 is determined, positions of the bearings 16a-16d in relation to the reaction element 18 may be calculated to determine where each of the track surfaces 14a-14d will be located when the reaction element 18 is in a certain position along the path 39b. A horizontal position of the bearing 16b, which represents a leading bearing on an outside edge of the mover 12, may be calculated by taking a length 47 that is divided by two and multiplied by the sine of the angle 43 and adding the resulting value to the length 45. The length 47 represents a width between the leading bearings 16b and 16a and the lagging bearings 16d and 16c, respectively. Additionally, a vertical position of the bearing 16b may be calculated by taking the length 47 that is divided by two and multiplied by the cosine of the angle 43 and adding the resulting value to the length 46. The resulting horizontal and vertical position of the bearing 16b is the position where the track surface 14b may be positioned as the track surface 14b traverses the path 39b.

Additionally, a horizontal position of a portion the bearing 16d, which represents a lagging bearing on the outside edge of the mover 12, that interacts with the track 14d may be calculated by taking the length 47 that is divided by two and multiplied by the sine of the angle 43 and subtracting the resulting value from the length 45. Further, a vertical position of a portion of the bearing 16d that interacts with the track 14d may be calculated by taking the length 47 that is divided by two and multiplied by the cosine of the angle 43 and subtracting the resulting value from the length 46. The resulting horizontal and vertical position of the bearing 16d is the position where the track surface 14d may be positioned as the track surface 14d traverses the path 39b.

Further, a horizontal position of a portion of the bearing 16a, which represents a leading bearing on an inside edge of the mover 12, that interacts with the track 14a may be calculated by taking a length 48 multiplied by the cosine of the angle 43 and adding the resulting value to the horizontal position of the bearing 16b. The length 48 represents a bearing gap between the bearings 16b and 16d on the outside edge of the mover 12 and the bearings 16a and 16c on the inside edge of the mover 12, respectively. Additionally, a vertical position of a portion of the bearing 16a that interacts with the track 14a may be calculated by taking the length 48 multiplied by the cosine of the angle 43 and subtracting the resulting value from the vertical position of the bearing 16b. The resulting horizontal and vertical position of the bearing 16a is the position where the track surface 14a may be positioned as the track surface 14a traverses the path 39b.

Furthermore, a horizontal position of a portion of the bearing 16c, which represents a lagging bearing on the inside edge of the mover 12, that interacts with the track 14c may be calculated by taking a length 48 multiplied by the cosine of the angle 43 and adding the resulting value to the horizontal position of the bearing 16b. Additionally, a vertical position of a portion of the bearing 16c that interacts with the track 14c may be calculated by taking the length 48 multiplied by the sine of the angle 43 and subtracting the resulting value from the vertical position of the bearing 16d. The resulting horizontal and vertical position of the bearing 16c is the position where the track surface 14c may be positioned as the track surface 14c traverses the path 39b.

As discussed above, once the location of the portions of the bearings 16a-16d that interact with the track surfaces 14a-14d are calculated for every incremental location of the reaction element 18, the positioning of the track surfaces 14a-14d for every incremental location of the mover 12 becomes known. In this manner, the track surfaces 14a-14d may be positioned in such a manner that the bearings 16a-16d maintain constant contact with the track surfaces 14a-14d, respectively, as the mover 12 moves through curved portions 42 of the track 14. Further, the track surfaces 14a-14d may also be positioned in such a manner that the reaction element 18 maintains constant spacing from, and parallel alignment with, the magnetic drive system 20 as the mover 12 moves through the curved portions 42 of the track 14.

Figure 7:
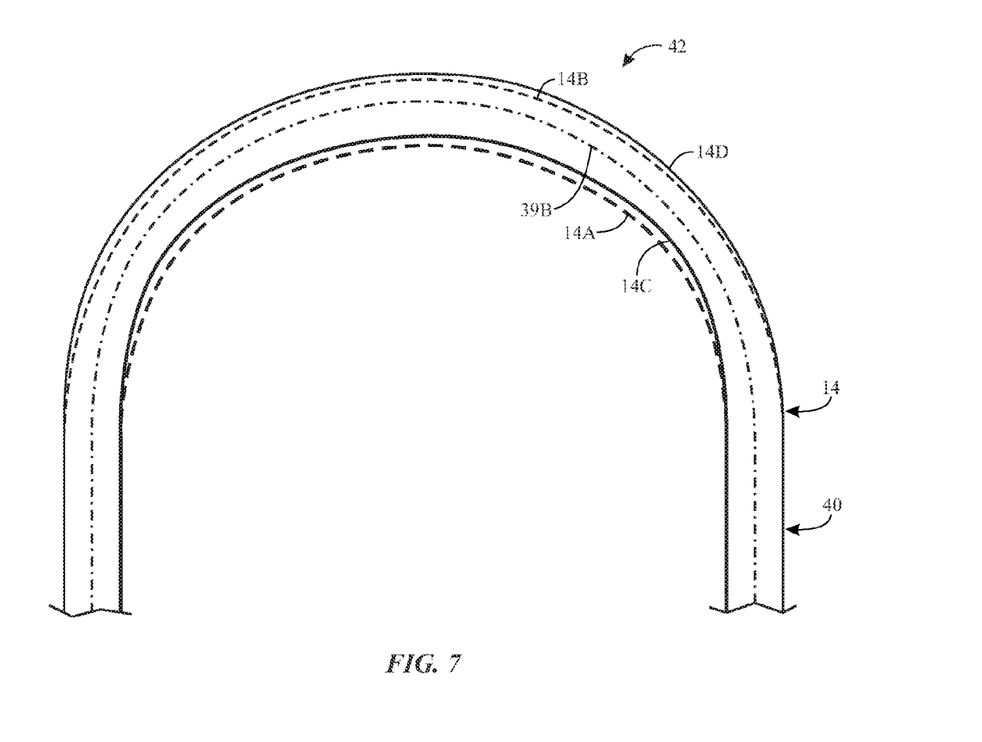
FIG. 7 is an overhead view of another embodiment of trajectories of different surfaces of the track of the linear drive transport system, in accordance with present embodiments.

FIG. 7 is an overhead view of another embodiment of trajectories of the different surfaces 14a-14d of the track 14 of the linear drive transport system 10, in accordance with present embodiments. As illustrated, each of the track surfaces 14a-14d has a unique trajectory about the track 14. It may be appreciated that the track 14 depicted in FIG. 7 is representative of a track 14 for use with the mover 12 that has bearings 16a and 16b spaced apart at an equal distance as bearings 16c and 16d. Accordingly, the track surfaces 14a-14d of the track 14 with a T-shaped configuration, as depicted in FIG. 4, may include slightly different trajectories. For example, the track surfaces 14c and 14d may be closer together than the track surfaces 14a and 14b, and the track surfaces 14c and 14d may generally avoid overlap with the track surfaces 14a and 14b, respectively, at any point along the track 14.

Also depicted is the path 39b of a point along an outer side of a central portion of the mover 12. The path 39b may represent a path of a point on the mover 12 that is positioned halfway between the leading bearing 16b and the lagging bearing 16d on the outer portion of the mover 12. Point $P_1$ in FIG. 1 is representative of this position. Because of the unique trajectories of the track surfaces 14a-14d, the path 39b is defined by travel about the track 14 in a continuous manner. That is, the path 39b may define a curvature of the track 14 throughout the straight portions 40 and the curved portions 42 of the track 14. In this manner, the mover 12 may maintain the reaction element 18 at a substantially constant distance and alignment with the path 39b of the track 14. Further, the reaction element 18 may include multiple reaction elements 18 that are each maintained at a fixed distance from the path 39b of the track 14. Further, in some situations, it may also be desirable to change a distance of the reaction elements 18 from the drive system 20 of the track 14. In such a situation, the track surfaces 14a-14d may be arranged in such a manner to alter the path 39b to a different spacing from the drive system 20 of the track 14 when the mover 12 travels along the track 14.

Greater control over the mover 12 may be especially evident in the curved portions 42 of the track 14, as a single trajectory track of a linear drive transport system 10 may result in several undesired changes in distance and orientation between the reaction element 18 and the magnetic drive system 20 throughout the course of a single curved portion 42 of the track 14. As distances and orientation between the reaction element 18 and the magnetic drive system 20 change, control of the electromagnet coils 26 of the magnetic drive system 20 may also change to maintain a constant velocity and performance of the mover 12. Accordingly, the unique trajectories of the track surfaces 14a-14d may enable reduced complexity in the control system 32 for maintaining the velocity and performance of the mover 12. Further, the unique trajectories of the track surfaces 14a-14d may enable greater accuracy in the positioning of the movers 12 along the track 14.

It may also be appreciated that the unique trajectories of the track surfaces 14a-14d also enable increased efficiency of the movement of the mover 12. For example, in a singular trajectory system, some of the bearings 16 of the mover 12 may be forced off of the track 14 as the mover 12 enters and exits a curved portion 42 of the track 14. Using the track surfaces 14a-14d illustrated in FIG. 7, all of the bearings 16a-16d maintain constant contact with the track 14 as the mover 12 enters and exits the curved portions 42 of the track 14. For example, due to the unique trajectories of the track surface 14a-14d, a more complex motion of the mover 12 is established as the mover 12 moves about the curve portions 42 of the track 14. The complex motion of the mover 12 may include aspects of rotation of the mover 12 rather than a more direct movement of the mover 12. Due to the constant contact between the bearings 16a-16d and the track surfaces 14a-14d, the mover 12 may be able to enter and exit the curved portions 42 of the track 14 at a greater velocity without resulting in excessive wear on the track 14 or the mover 12, as discussed above in the discussion of FIG. 5.

Because it is desirable for the reaction element 18 to follow the path 39b, the track surfaces 14a-14d provide unique trajectories for the bearings 16a-16d of the mover 12 to maintain the path 39b for the reaction element 18. That is, each of the track surfaces 14a-14d include a trajectory about the track 14 that is different from the trajectories of the other track surfaces 14a-14d about the track 14. For example, assuming the mover 12 moves in a counter-clockwise direction about the illustrated track 14, the track surface 14a that interacts with the inside leading bearing 16a and the track surface 14b that interacts with the outside leading bearing 16b may each take shallow trajectories about the curved portion 42 of track 14. In contrast, the track surface 14c that interacts with the inside lagging bearing 16c and the track surface 14d that interacts with the outside lagging bearing 16d may each take deeper paths about the curved portion 42 of the track 14 than the track surfaces 14a and 14c, respectively. In contrast to the track surfaces 14a-14d of FIG. 5, the track surfaces 14a-14d in FIG. 7 each maintain distinct trajectories from one another throughout the curved portion 42 of the track 14. This may be particularly evident when the curved portion 42 of the track 14 includes curvature continuous splines. For example, when the curved portion 42 does not maintain a constant radius throughout the entirety of the curved portion 42, the track surfaces 14a-14d may constantly change trajectories to maintain the reaction element 18 along the path 39b. Accordingly, the trajectories of the track surfaces 14a-14d are determined by maintaining the reaction element 18 of the mover 12 along the path 39b throughout the curved portion 42 of the track 14.

Figure 8:
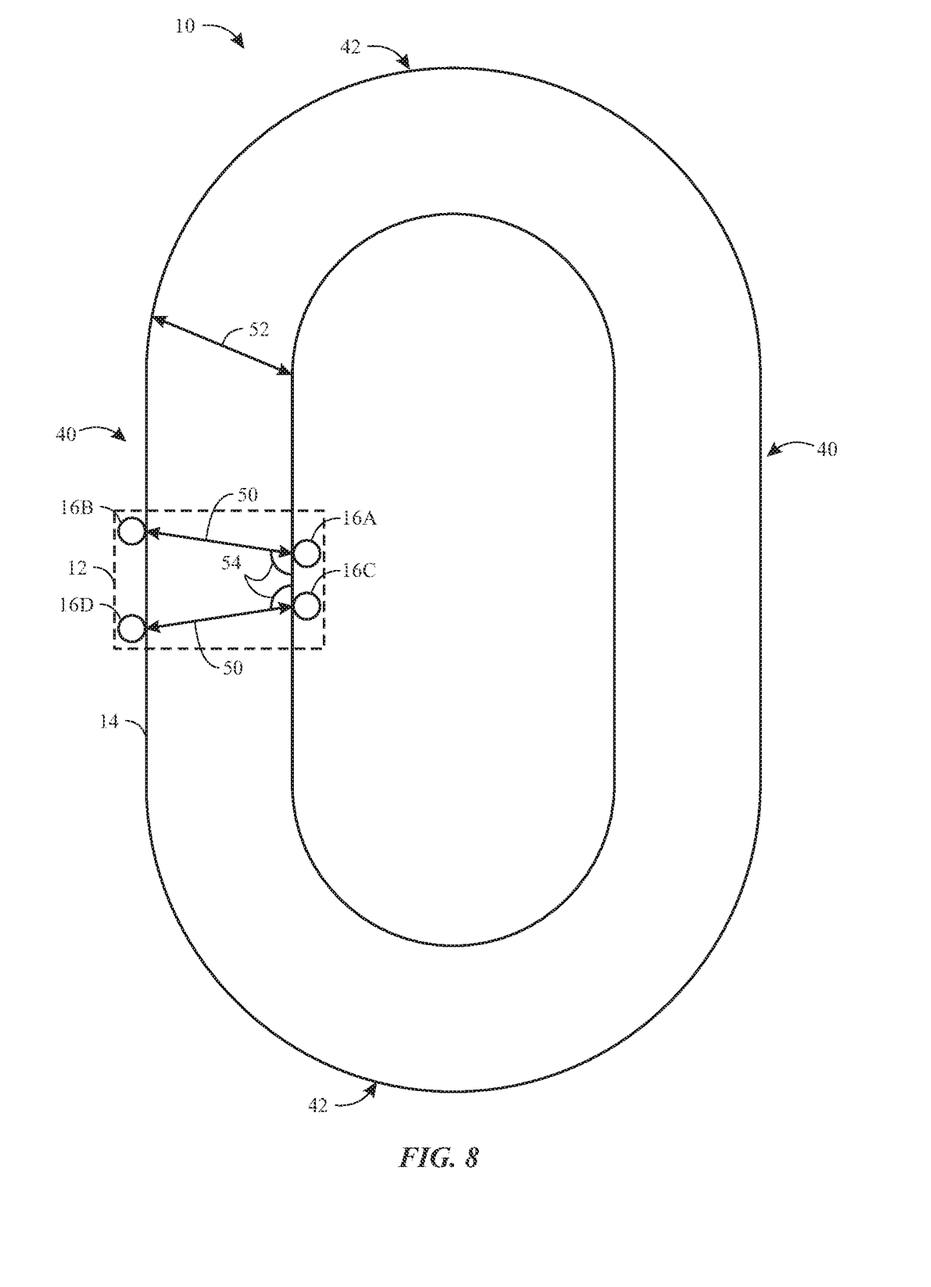
FIG. 8 is an overhead schematic view of a configuration of bearings of the mover and the track of the linear drive transport system, in accordance with present embodiments.

FIG. 8 is an overhead schematic view of an alignment of bearings 16 of the mover 12 and the track 14 of the linear drive transport system 10, in accordance with present embodiments. The alignment of the bearings 16a-16d may generally form a trapezoidal shape, as illustrated. That is, the inside bearings 16a and 16c may be closer to one another than the outside bearings 16b and 16d. In this alignment, the track 14 may include a single trajectory while still substantially maintaining contact between the bearings 16a-16d and the track surfaces 14a-14d as the mover 12 enters and exits the curved portions 42 of the track 14. As used herein, the phrase "substantially maintaining contact" may refer to the bearings 16a-16d limiting separation from the track surfaces 14a-14d by less than 0.005 inches.

To accomplish substantially maintaining contact between the bearings 16a-16d and the track surfaces 14a-14d, a distance 50 between the inside and outside bearings 16a and 16b and bearings 16c and 16d may be similar to a distance 52 between an inner edge of the track 14 and an outer edge of the track 14 as the track 14 enters the curved portion 42 of the track 14. Accordingly, an angle 54, which is an angle between a straight line between bearings 16a and 16b and an inner edge of the track 14, may vary as a function of the width of the track and a radius of the curved portion 42. For example, a ratio of a first length between bearings 16b and 16d and a second length between bearings 16a and 16c may change as a function of the width of the track 14 and the radius of the curved portion 42.

In this manner, the bearings 16 of the mover 12 may be calibrated to match the track 14 based on the width of the track 14 and the radius of the curved portions 42 of the track 14. Further, the trapezoidal alignment of the bearings 16 may be useful for implementation along a track 14 with multiple curved portions 42 each having the same radius. In particular, the trapezoidal alignment of the bearings 16 may be beneficial for tracks 14 that are already in operation to replace a rectangularly configured mover 12 to improve efficiency of the linear drive transport system 10 and to reduce wear on components of the linear drive transport system 10, such as the track 14 and the bearings 16 of the movers 12.

It may also be appreciated that incorporating the track surfaces 14a-14d with unique trajectories about the curved portions 42 of the track 14, as described in the discussion of FIGS. 4-7, with the mover 12 that includes bearings 16a-16d arranged in a trapezoidal arrangement may remove the separation of the bearings 16a-16d from the track surfaces 14a-14d. Accordingly, the mover 12 with the bearings 16a-16d arranged in the trapezoidal arrangement may minimize s In the preceding specification, various embodiments have been described with reference to the accompanying drawings. It will, however, be evident that various modifications and changes may be made thereto, and additional embodiments may be implemented, without departing from the broader scope of the present disclosure as set forth in the claims that follow. The specification and drawings are accordingly to be regarded in an illustrative rather than restrictive sense.

While only certain features of present embodiments have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A linear drive transport system, comprising:
   a track comprising a plurality of contact surfaces, wherein the contact surfaces define perimeter boundaries of the track;
   a mover comprising a plurality of bearings configured to engage the plurality of contact surfaces and configured to move along the track via a magnetic drive system;
   first, second, third, and fourth contact surfaces of the plurality of contact surfaces, wherein the first and second contact surfaces are positioned opposite one another and the third and fourth contact surfaces are positioned opposite one another, wherein the first and second contact surfaces are uniformly spaced apart along straightaway portions of the track by a first spacing distance and the third and fourth contact surfaces are uniformly spaced apart along the straightaway portions of the track by a second spacing distance;
   a first leading bearing of the mover engaging the first contact surface and a second leading bearing disposed opposite the first leading bearing and engaging the second contact surface, wherein the first and second leading bearings are coupled to a body of the mover a first fixed distance from one another;
   a first trailing bearing of the mover engaging the third contact surface and a second trailing bearing disposed opposite the first trailing bearing and engaging the fourth contact surface, wherein the first and second trailing bearings are coupled to the body of the mover a second fixed distance from one another, the first trailing bearing is coupled to the body of the mover a third fixed distance from the first leading bearing, and the second trailing bearing is coupled to the body of the mover a fourth fixed distance from the second leading bearing; and
   curved portions of the track wherein the first contact surface defines a portion of the perimeter boundary with a first trajectory different than a second trajectory of the second contact surface in the corresponding curved portions of the track, wherein the first and second trajectories maintain contact with the first and second leading bearings throughout the curved portions the track, wherein the first and second contact surfaces are spaced apart along the curved portions of the track by a third spacing distance different from the first spacing distance.

2. The system of claim 1, wherein the third contact surface defines a portion of the perimeter boundary with a third trajectory different than a fourth trajectory of the fourth contact surface in the corresponding curved portions of the track, wherein the third and fourth trajectories maintain contact with the first and second trailing bearings throughout the curved portions of the track, wherein the third and fourth contact surfaces are spaced apart along the curved portions of the track by a fourth spacing distance different from the second spacing distance.

3. The system of claim 2, wherein the first trajectory, the second trajectory, the third trajectory, and the fourth trajectory are each different from one another.

4. The system of claim 2, wherein the fourth spacing distance is one of a plurality of varying spacing distances that space apart the third and fourth contact surfaces along the curved portions of the track.

5. The system of claim 1, wherein the third fixed distance and the fourth fixed distance are equal.

6. The system of claim 1, wherein the first contact surface, the second contact surface, the third contact surface, and the fourth contact surface form a T-shaped configuration of the track.

7. The system of claim 1, wherein the third contact surface is disposed beneath the first contact surface and the fourth contact surface is disposed beneath the second contact surface.

8. The system of claim 1, wherein the first contact surface and the second contact surface each bow toward an outer edge of the track when straight sections of the track enter the curved sections of the track, and the third contact surface and the fourth contact surface each bow toward the outer edge of the track when the curved sections of the track enter the straight sections of the track.

9. The system of claim 8, wherein the mover comprises a reaction element, the track comprises the magnetic drive system, and the reaction element of the mover interacts with the magnetic drive system to generate a propulsive force on the mover.

10. The system of claim 9, wherein the first trajectory, the second trajectory, the third trajectory, and the fourth trajectory maintain a position of the reaction element at a distance from and orientation with the magnetic drive system.

11. The system of claim 1, wherein the third spacing distance is one of a plurality of varying spacing distances that space apart the first and second contact surfaces along the curved portions of the track.

12. A linear drive transport system, comprising:
a track comprising:
a first track surface, a second track surface, a third track surface, and a fourth track surface that define perimeter boundaries of the track, wherein the first track surface comprises a first trajectory about the track, the second track surface comprises a second trajectory about the track, the third track surface comprises a third trajectory about the track, and the fourth track surface comprises a fourth trajectory about the track, and the first trajectory, the second trajectory, the third trajectory, and the fourth trajectory are each different from one another, wherein the first track surface and the second track surface each bow toward an outer edge of the track while the third track surface and the fourth track surface each maintain a straight path where a straight section of the track transitions to a curved section of the track; and
a magnetic drive system; and
at least one mover configured to move along the track, wherein the at least one mover comprises:
a first leading bearing that interacts with the first track surface, a second leading bearing that interacts with the second track surface, a first lagging bearing that interacts with the third track surface, and a second lagging bearing that interacts with the fourth track surface, wherein the first leading bearing and the second leading bearing are coupled to the at least one mover at a first fixed distance from one another, and the first lagging bearing and the second lagging bearing are coupled to the at least one mover at a second fixed distance that is equal to the first fixed distance; and
a reaction element configured to interact with the magnetic drive system of the track to generate a propulsive force on the mover.

13. The system of claim 12, wherein the first, second, third, and fourth trajectories are configured to maintain contact between the first and second lagging bearings and the first and second leading bearings of the at least one mover and the track when the at least one mover enters or exits a curved section of the track.

14. The system of claim 12, wherein the third track surface is disposed beneath the first track surface, and the fourth track surface is disposed beneath the second track surface.

15. The system of claim 12, wherein the first track surface and the second track surface each maintain a straight path and the third track surface and the fourth track surface each bow toward an outer edge of the track where the curved section of the track transitions to the straight section of the track.

16. A track of a linear drive transport system, comprising:
a magnetic drive system disposed along the track and configured to interact with a reaction element of a mover to provide a propulsive force on the mover that propels the mover about the track; and
a first track surface, a second track surface, a third track surface, and a fourth track surface that define perimeter boundaries of the track; and
a curved portion;
wherein the first track surface comprises a first trajectory about the track, the second track surface comprises a second trajectory about the track, the third track surface comprises a third trajectory about the track, and the fourth track surface comprises a fourth trajectory about the track, and the first trajectory, the second trajectory, the third trajectory, and the fourth trajectory are each different from one another;
wherein the third track surface is disposed beneath the first track surface;
wherein the first trajectory is deeper than the third trajectory along the curved portion; and
wherein the first track surface, the second track surface, the third track surface, and the fourth track surface are configured to maintain contact with bearings of the mover as the mover travels about the track.

17. The track of claim 16, wherein the fourth track surface is disposed beneath the second track surface, and the second trajectory is deeper than the fourth track surface along the curved portion.

18. The track of claim 16, wherein the first trajectory, the second trajectory, the third trajectory, and the fourth trajectory maintain the reaction element of the mover at a predetermined distance from the magnetic drive system.

19. The track of claim 16, comprising a fifth track surface positioned on a side of the magnetic drive system opposite the first track surface, the second track surface, the third track surface, and the fourth track surface, wherein the fifth track surface is configured to interact with a lower bearing of the mover.

20. The track of claim 16, comprising a control system configured to detect a control sensor of the mover to provide an accurate indication of a location of the mover along the track.

* * * * *